Dec. 31, 1968  T. J. GRIFFEN  3,419,037
POWER PARKING BRAKE VACUUM RELEASE SWITCH
Filed Oct. 23, 1965

INVENTOR.
Thomas J. Griffen
BY
HIS ATTORNEY

United States Patent Office 3,419,037
Patented Dec. 31, 1968

3,419,037
POWER PARKING BRAKE VACUUM RELEASE SWITCH
Thomas J. Griffen, Dearborn, Mich., assignor to General Motors Corporation, Detroit, Mich., a corporation of Delaware
Filed Oct. 23, 1965, Ser. No. 504,025
3 Claims. (Cl. 137—351)

ABSTRACT OF THE DISCLOSURE

A valve for controlling the release of a vehicle parking brake is actuated by the selection of a transmission mode consistent with vehicle movement. The parking brake cannot be latched when such a mode is selected, but can be operated to impede vehicle movement.

---

This invention relates to valves and more particularly to a valve arranged to selectively shut off fluid communication between a negative pressure source and a pressure operable device while establishing fluid communication between the atmosphere and the pressure operable device.

In the operation of motor vehicles equipped with a parking brake and automatic transmission, it is normally possible to select a mode for the transmission consistent with vehicle motion while the parking brake is engaged. It is desirable to key a transmission mode selection consistent with vehicle motion, for example, DRIVE or REVERSE mode, with an automatic parking brake release mechanism so that the parking brake cannot remain engaged when a mode of the transimssion is selected indicative of an operator's desire to move the vehicle. At the same time, it is desirable to bring about the aforementioned goal without detracting from the operability of the parking brake independently of the transmission mode selected. Therefore, a parking brake must be always capable of acting as an emergency brake while the transmission is in a mode consistent with vehicle motion.

It is an object of the present invention to provide an improved means for automatically valving power to an automatic parking brake release mechanism when a mode is selected in a vehicle transmission consistent with vehicle motion.

It is another object of the present invention to provide an improved valve for carrying out the aforementioned object.

It is still another object of the present invention to provide an improved fluid valve responsive to a mode selection in a vehicle transmission to selectively provide a fluid communication between a power source and a parking brake release mechanism or the atmosphere in a parking brake release mechanism.

Further objects and advantages of the present invention will be apparent from the following description, reference being made to the accompanying drawings wherein a preferred embodiment of the present invention is clearly shown.

Figure 1:
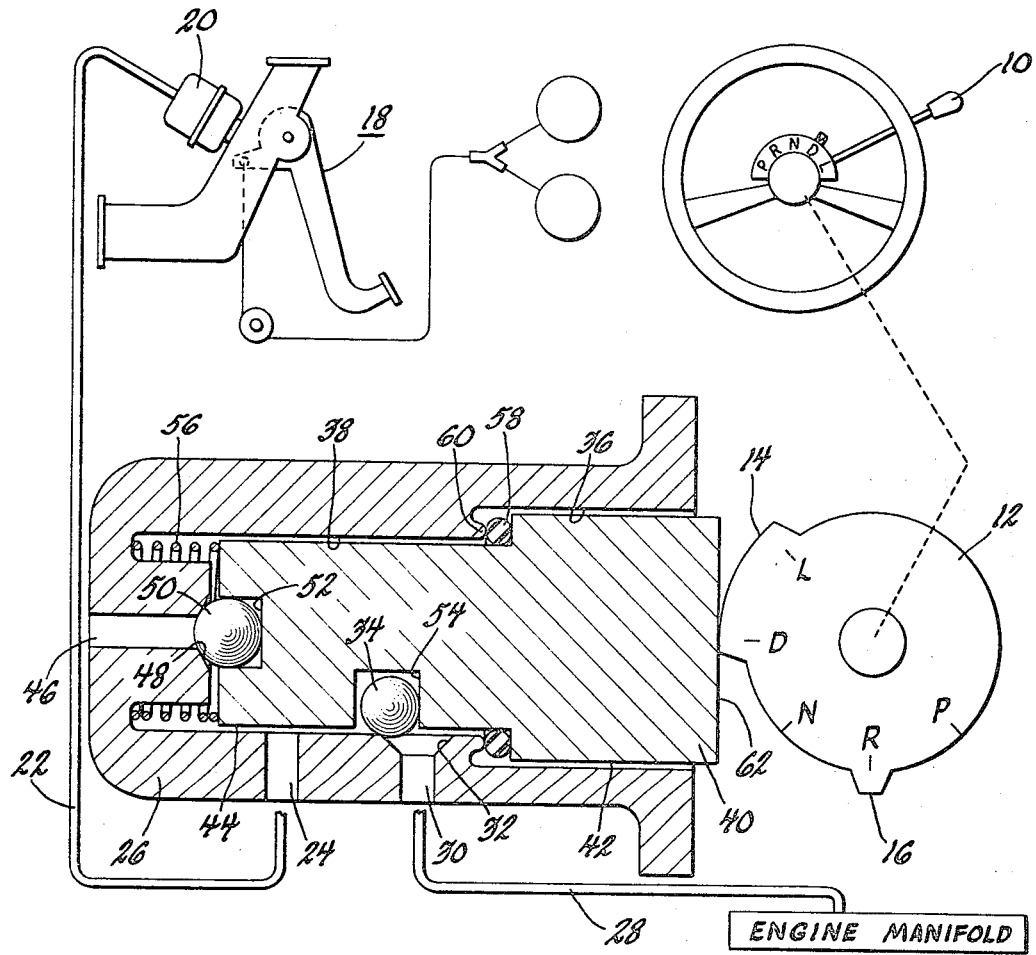
FIGURE 1 shows a sectional view of the subject invention diagrammatically shown in its operative environment.

Referring to FIGURE 1, a transmission mode selector 10 is shown as driving a rotatable element 12 having cam surfaces 14 and 16 disposed on the outer periphery thereof. It is seen that the raised portion of cams 14 and 16 correspond to the modes of DRIVE, LOW and REVERSE which are consistent with vehicle motion. Modes PARK and NEUTRAL are lower with respect to cam surfaces 14 and 16 and are usually selected when no vehicle motion is desired.

A parking brake generally designated by the numeral 18, is releasable by a vacuum actuator 20 in any well-known manner by pressure communicated through line 22 attached to outlet 24 in valve body 26. A negative pressure is communicated from the engine manifold through line 28 to an inlet 30 of valve body 26. Inlet 30 has a cup-shaped seat 32 adapted to receive ball 34 sometimes referred to herein as the first displaceable element.

Valve body 26 has a major bore 36 and a minor bore 38. Slidable in bores 36 and 38 is a shiftable slide 40 having a major diameter 42 and a minor diameter 44. The diameters of the shiftable slide 40 are arranged to cooperate with bores 38 and 36 during translational movement of shiftable slide 40. An outlet 46 from valve body 26 communicates atmospheric pressure from the exterior valve body to the interior portion. Outlet 46 includes a cup-shaped seat 48 against which ball 50 sets during a portion of the operation of the device. Ball 50 is sometimes referred to herein as the second displaceable element.

Shiftable slide 40 includes a slot 52 substantially the same size as ball 50 to pilot ball 50 during movement of slide 40. An oversize slot 54 is arranged to guide and drive ball 34 in and out of engagement with cup-shaped seat 32 depending on the mode selected by transmission mode selector 10. Spring 56 provides a biasing force against shiftable slide 40 so that the tendency of the valve is to have ball 34 out of sealing engagement with seat 32. Only when one of the cam surfaces 14 or 16 shifts slide 40 against the bias of spring 56 will ball 34 be driven from its seat and ball 50 seated.

It should be noted that O-ring 58 is carried at the innersection of the minor bore 44 and the major bore 42 and is adapted to move into sealing engagement with seat 60 formed as a stepped portion integral with valve body 26 at the junction of major bore 36 and minor bore 38 thereof.

In operation, the subject valve responds to movement of the transmission mode selector as transmitted to element 12. This is done in any well-known manner and results in the rotation of element 12 bringing some portion of the outer periphery of element 12 into engagement with surface 62 of shiftable slide 40. It is understood that, in the description of the subject device, the terms DRIVE, LOW and REVERSE are names given to a mode selection of the transmission consistent with vehicle motion while the terms NEUTRAL and PARK designate mode selection inconsistent with vehicle motion. The particular terms chosen are for description purposes alone and it is understood that any apppellation given to a transmission mode selection consistent with vehicle motion conforms to the inventive concept set forth herein.

Normally, when a vehicle is stopped, the parking brake is set by the vehicle operator and the transmission mode selector may be left as it was when the brakes were applied and the engine shut off or a NEUTRAL or PARK mode selector may be made. It is assumed for the purposes of this description that the vehicle transmission mode selection was PARK. Normally, it is necessary to position the transmission mode selector in either NEUTRAL or PARK to start the vehicle engine. This would result in the lower portions of the outer periphery of element 12 being disposed against surface 62. Therefore, slide 40 would be shifted to the far right as viewed in the drawing and ball 34 would be positioned in seat 32. Under these conditions of operation, vacuum actuator 20 would be in fluid communication with outlet 46 to atmosphere and also to the atmosphere past O-ring 58. The engine manifold would become negatively pressurized on engine start but ball 34 would prevent the communication of this pressure to the valve body. As long as the transmission mode selector remained in either the NEUTRAL or PARK mode, this situation would persist. Therefore, the parking brake 18 engaged at the previous engine shut down would remain engaged.

When vehicle motion is desired, the vehicle operator moves the transmission mode selector 10 to a mode consistent with vehicle motion. This would be any one of the modes of DRIVE, LOW or REVERSE. With any of these modes selected, element 12 follows the movement of selector 10 and moves either surface 14 or 16 into engagement with surface 62 of shiftable slide 40. When this is done, slide 40 is driven against the force of spring 56 into the position shown in the drawing. Slot 54 moves ball 34 off cup-shaped seat 32 and also moves ball 50 onto seat 48. Simultaneously, O-ring 58 is carried into sealing engagement with seat 60. When this sequence has taken place, engine manifold vacuum is communicated through inlet 30 past ball 34 into outlet 24 thereby energizing vacuum actuator 20. It is understood that the communication of atmospheric pressure between outlet 46 and outlet 24 is cut off by ball 50 being seated and also between diameter 42 and 44 relative to valve body by O-ring 58. Engine manifold vacuum acting on actuator 20 releases parking brake 18 automatically so that the vehicle can move freely under its own power.

The cycle previous described is reversed and the transmission mode selector is moved to a mode inconsistent with vehicle motion, for example, NEUTRAL or PARK. When this occurs, the lower surfaces on the periphery of element 12 move into engagement with surface 62 of shiftable slide 40. Spring 56 which maintains a bias against slide 40 moves said slide into the depressed outer portions of element 12. Slot 54 allows ball 34 to be drawn onto seat 32, ball 50 is moved off seat 48 by atmospheric pressure in inlet 46, and O-ring 58 is carried from seat 60. Therefore, the subject valve is then in a poised position with atmospheric pressure going to vacuum actuator 20 allowing an actuation and latching parking brake 18.

Figure 2:
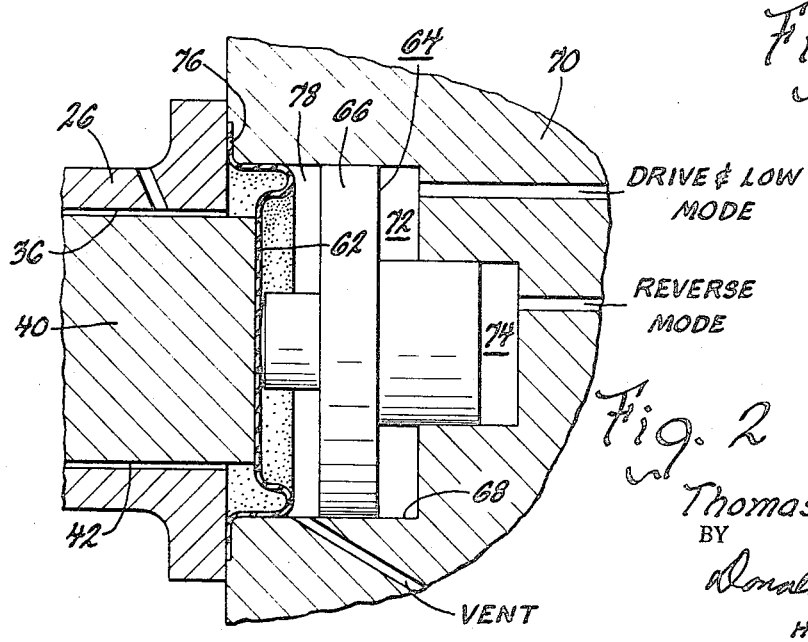
FIGURE 2 illustrates another valve actuator.

Referring to FIGURE 2, a transmission mode selector 10 is shown which controls the transmission internal pressures in a conventional manner and these pressures are directed to shiftable slide 40 through valve 64. Valve 64 comprises a piston 66 slidable in bore 68 of transmission housing 70 responding to pressures in chambers 72 and 74. Chamber 72 is in fluid communication with the drive and low mode transmission pressures while chamber 74 is in fluid communication with the reverse mode transmission pressures. It is noted that the area of piston 66 exposed to chamber 74 is less than that exposed to chamber 72 due to the generally higher pressures generated during reverse mode selection. Diaphragm 76 is contained between housing 70 and valve body 26 to prevent vacuum pressure communication to the transmission housing. Chamber 78 formed by diaphragm 76 and piston 60 vents to the transmission in any well-known manner. Valve body 26 is conventionally clamped to the transmission housing in any well-known manner.

In operation, chambers 72 and 74 are always exposed to areas of the transmission pressurized during a mode selection consistent with vehicle motion, i.e., drive, low or reverse. When such a mode is selected by lever 10, piston 66 shifts into slide 40 thereby keeping ball 50 seated and ball 34 unseated. Under these conditions, vacuum is applied to actuator 20 keeping the brake 18 unenergized. The sequence of valve cycling is exactly the same as described for the mechanical actuation previously described. The advantage of this hydraulic actuator is that the valve operation is independent of transmission linkage adjustment and functions when the transmission pressures are actually being utilized for vehicle movement. This is a safety feature important when used in certain transmissions in common useage. It is also clear that the valve switches with very little movement thereby preventing force from being exerted on a locked parking brake.

The subject invention therefore prevents the vehicle operator from inadvertently leaving a parking brake applied when vehicle motion is desired by merely moving a transmission mode selector to a mode consistent with vehicle motion. While this mode is selected, the parking brake cannot be latched in an actuated position but can be operated to impede movement of the vehicle under emergency conditions. Therefore, the utility of the parking brake is not affected and the automatic releasing of the parking brake when appropriate is automatically controlled.

While the embodiments of the present invention, as herein disclosed, constitutes a preferred form, it is to be understood that other forms might be adopted.

What is claimed is as follows:

1. A valve for use with a vehicle having an automatic parking brake release keyed to a transmission mode selection, said valve comprising: a valve body including an inlet from an engine intake manifold, an outlet to a vacuum operated parking brake release mechanism, and an outlet to atmosphere, said valve body having a major bore and a minor bore and a stepped portion between the two bores acting as a valve seat; a shiftable slide responsive to movement of a transmission mode selector lever for movement from a first position to a second position, said shiftable slide having a major diameter cooperating with said major bore and the minor diameter cooperating with said minor bore, the intersection of said two bores providing a locating means for a sealing means adapted to cooperate with the seat between said major and minor bores; displaceable elements carried in notch portions of said shiftable slide and arranged to selectively seal off the outlet to atmosphere and the inlet from the engine intake manifold; and a rotatable actuator having cam portions on the outer periphery thereof arranged to shift said shiftable slide between positions wherein the pressure operable parking brake release is actuated in a manner consistent with the mode selected by the transmission mode selector.

2. A valve according to claim 1 wherein said inlet from the engine intake manifold includes a cup-shaped opening into which a first of said displaceable elements falls during movement of said shiftable slide in one direction to shut off pressure communication between the engine intake manifold and the automatic parking brake release mechanism, said first displaceable element being driven from it seat in the inlet when said shiftable slide moves from a position wherein said automatic parking brake release is in pressure communication with the atmosphere into a position wherein the engine intake manifold is in pressure communication with the automatic parking brake release.

3. A valve according to claim 1 wherein fluid communication between the atmosphere and the automatic parking brake release mechanism is had between an outlet from the valve body adapted to be sealed by a second of said displaceable elements and also between the major and minor diameters of the shiftable slide and the major and minor bores of said valve body when said first displaceable element is in sealing disposition with respect to said inlet.

References Cited

UNITED STATES PATENTS

| | | | |
|---|---|---|---|
| 2,197,231 | 4/1940 | Walker | 251—200 XR |
| 2,366,693 | 1/1945 | Benaway | 251—310 XR |
| 2,406,284 | 8/1946 | Fitch | 137—598 XR |
| 2,725,128 | 11/1955 | Martin | 192—4 |
| 2,725,129 | 11/1955 | Martin | 192—4 |
| 3,119,406 | 1/1964 | Hartung | 137—351 |
| 3,110,355 | 11/1963 | Tranbarger et al. | 192—4 |
| 3,119,477 | 1/1964 | Ryder | 192—4 |
| 3,121,553 | 2/1964 | Grove | 251—175 XR |

SAMUEL SCOTT, *Primary Examiner.*

U.S. Cl. X.R.

137—598, 607